Aug. 11, 1953

A. T. SCHEIWER 2,648,548

VALVED PIPE COUPLING

Filed Sept. 2, 1948

INVENTOR.
ALBERT T. SCHEIWER
BY
Florian G. Miller
Atty.

Patented Aug. 11, 1953

2,648,548

UNITED STATES PATENT OFFICE 2,648,548

VALVED PIPE COUPLING

Albert T. Scheiwer, Erie, Pa.

Application September 2, 1948, Serial No. 47,520

3 Claims. (Cl. 284—18)

This invention relates generally to couplings and more particularly to couplings for use in high pressure lines.

It has heretofore been practically impossible to connect hose lines wherein one or the other of the hose lines are under high pressure. In prior coupling members, it has been necessary to work against this pressure in making a connection and where the pressure is high enough, it has been necessary to make certain makeshift connections which require a considerable amount of time and it has not been possible to utilize a quick connection coupling in these instances. It has furthermore been necessary in these prior couplings to operate a locking sleeve in the connection of the couplings, thereby making it impossible for one man to make a connection between the couplings because of the pressure required to force the male member into the female member. Prior couplings of this general type which have been designed for high pressure use have been very bulky and impractical and also very costly.

It is, accordingly, an object of my invention to overcome the above and other defects in couplings for high pressure use and it is more particularly an object of my invention to provide a coupling for high pressure use which is simple in construction, economical in cost, economical in manufacture, and efficient in operation.

Another object of my invention is to provide a quick connecting coupling for high pressure use which minimizes the pressure against which the valves in the coupling members must work against.

Another object of my invention is to provide a quick connecting coupling for high pressure use which has novel and efficient sealing means therein.

Another object of my invention is to provide a quick connecting coupling which has novel features of construction for closing the ends thereof when disconnected to prevent dust and dirt from entering the coupling members.

Another object of my invention is to provide a coupling for high pressure use wherein a coupling may be made without any manual operation of a locking sleeve or the like.

Other objects of my invention will become evident from the following detailed description, taken in conjunction with the accompanying drawings, in which Fig. 1 is a side elevational view broken away at the center thereof of my novel coupling in a connected position;

Figure 1:
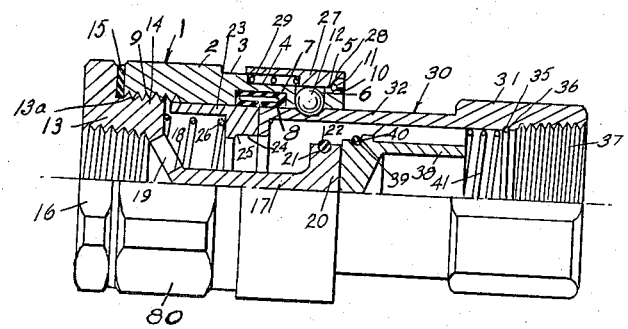
Figure 2:
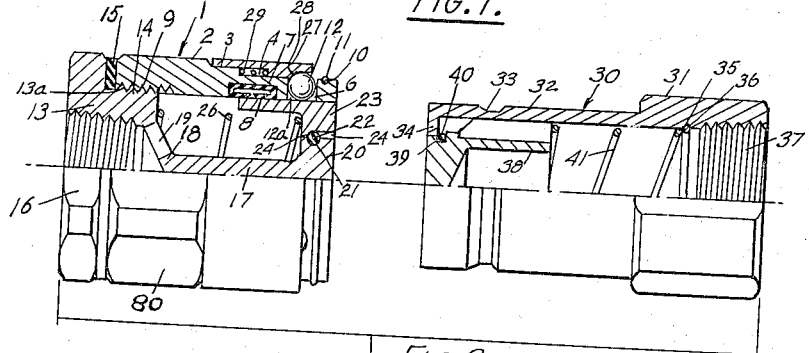
Fig. 2 is a side elevational view broken away on the center line of my novel coupling in an uncoupled position.
Figure 3:
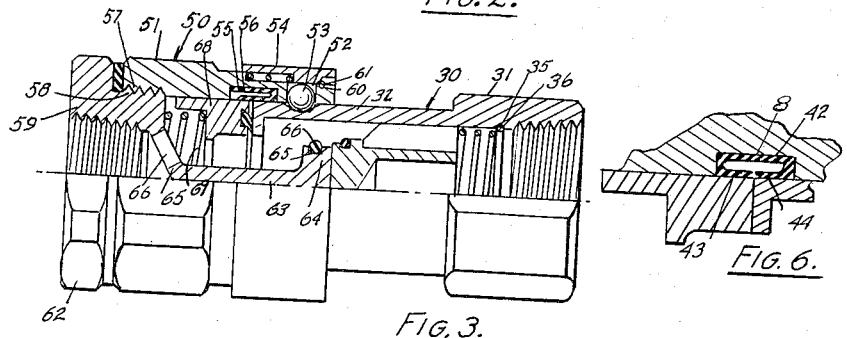
Fig. 3 is a side elevational view broken away on the center line thereof of a modified form of my invention.
Figure 4:
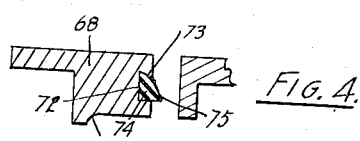
Fig. 4 is an enlarged fragmentary view showing the washer in the coupling of Fig. 3.
Figure 7:
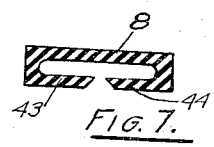
Figure 5:
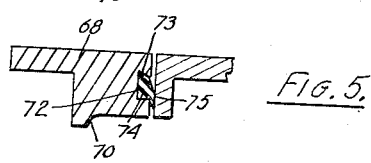

Fig. 5 is an enlarged fragmentary view of the washer shown in Figs. 3 and 4 in a sealing position; and Figs. 6 and 7 are enlarged fragmentary views of the annular washer in the coupling shown in Figs. 1 and 2.

Referring now to the drawings, I show in Figs. 1, 2, and 6 a female member 1 comprising a cylindrical shell 2 having stepped portions 3, 4, and 5, radially extending apertures 6, an inner annular groove 7 for receiving the rectangular shaped washer 8, an internally threaded portion 9, and an annular groove 10 for receiving a stop clip 11. Camming members or balls 12 are retained in the ball retaining apertures 6. A connecting member 13a has a threaded portion 14 for threadably engaging the threaded portion 9 of the shell 2. A gasket 15 is disposed between the wrench engaging portion 16 on the member 13a and the wrench engaging portion 80 on the shell 2. A cylindrical projecting member 17 is connected to the member 13a by a web 18 having apertures 19 for the flow of fluid. The cylindrical projecting member 17 has an enlarged end portion 20 with an annular groove 21 for receiving an annular washer 22. The outer face of the end 20 is flush with the end of the shell 2. An L-shaped sleeve 23 is telescopically disposed in the shell 2 and it has a cutaway portion 24 forming a shoulder 25 for sealingly engaging the washer 22 when the female member 1 is in an uncoupled position as shown in Fig. 2. A coil spring 26 urges the sleeve 23 into the sealed position shown in Fig. 2 when it is uncoupled. A locking sleeve 27 is telescopically disposed on the outer side of the shell 2 and it has a camming portion 28 for urging the balls 12 inwardly through the force of a coil spring 29. The connecting member 13a has a threaded portion 13 for connection to a hose coupling.

A male member 30 comprises a cylindrical member 31 having a reduced connecting portion 32 with an annular groove 33, an inwardly projecting flanged portion 34 on the end thereof, an annular inner groove 35 for retaining a stop clip 36, and a threaded portion 37 for connection to a hose coupling. A webbed member 38 is telescopically disposed in the male member 30 and it has an annular groove 39 for receiving a washer 40 which sealingly engages the inwardly flanged portion 34 of the male member 30 when it is uncoupled as shown in Fig. 2. As spring 41 urges the washer 40 into sealed relation with the flange 34.

It will be particularly noted in Fig. 6 that I have provided a novel rectangular shaped washer 42 having the inner sides 43 and 44 thereof sealingly engaging the telescoping sleeve 23 in the female member 1 and the connecting portion 32 of the male member 30 when in a connected position as shown in Fig. 1. The washer 42 may be built with one side 44 thereof inclined to prevent any binding when the couplings 1 and 30 move to an unconnected position.

In operation, the locking sleeve 27 is normally in a position as shown in Fig. 2 with the ball members 12 held in the path thereof by the sleeve 23 which is urged to the position shown in Fig. 2 by the spring 26. The connecting end 32 of the male member 30 is inserted into the female member 1 wherein it abuts against the end of the sleeve 23 and forces it rearwardly against the force of the spring 26. At the same time, the end 20 of the member 17 abuts against the outer end of the member 38 in the male member 30 and forces it rearwardly out of sealing relationship with the flanged portion 34 of the connecting portion 32 of the male member 30. The connecting portion 32 is forced inwardly until the balls 12 engage the annular groove 33 and the locking sleeve 27 is forced forwardly to a locking position as shown in Fig. 1 by the spring 29. Thus the fluid is free to flow through the apertures 19 in the web 18 to the male member 30 and female member 1 or vice versa.

Upon disconnection, the locking sleeve 27 is pushed against the force of the spring 29 out of engagement with the balls 12 wherein the male member 30 is freed and it is pulled outwardly from the female member 1. As the connecting portion 32 of the male member 30 is pulled outwardly the sleeve 23 moves forwardly therewith and holds the ball members 12 outwardly in the path of the camming portion 28 of the locking sleeve 27 to prepare the female member 1 for connection with the male member 30 without operation of the sleeve 27.

In Figs. 3, 4, and 5 I show a modified form of the coupling shown in Figs. 1 and 2 with the construction of the parts being substantially the same except that a slightly different type of sealing washer is used in sealing the male and female members. A female member 50 comprises an outer cylindrical shell 51 having ball retaining apertures 52 with the balls 53 therein, a spring-urged locking sleeve 54 thereon, a washer groove 55 for retaining a U-shaped washer 56, an internally threaded portion 57 for threadable engagement with the threaded portion 58 of a connecting member 59, and an annular groove 60 for retaining a stop clip 61. The connecting member 59 has a wrench engaging portion 62 and an inwardly projecting centrally disposed cylindrical portion 63 with an enlarged cylindrical head 64 and a web portion 65 with apertures 66 for the flow of fluid. The enlarged head 64 has an annular groove 65 thereon for retaining an annular washer 66. An L-shaped sleeve 68 is telescopically disposed in the shell 51 and a spring 69 urges it forwardly, the shoulder 70 thereon sealingly engaging the washer 66 on the cylindrical portion 64 of the projecting portion 63. The male member 30 is identical with the male member 30 shown in Figs. 1 and 2.

The L-shaped sleeve 68 has a laterally extending annular groove 72 with a tapered side 73 for receiving an annular washer 74 with one end 75 thereof extending angularly outwardly as shown in Fig. 4 so that the end thereof is forced downwardly against and towards the side of the sleeve 68 as shown in Fig. 5 to seal the end of the male member 30 and the face of the sleeve 68 when in a locked position as shown in Fig. 3.

The operation of my modified coupling shown in Figs. 3, 4, and 5 is identically the same as the operation of the coupling shown and described in Figs. 1 and 2. The only differences are in the sealing members.

It will be evident from the foregoing description that I have provided a novel coupling which permits a maximum flow of fluid, which minimizes back pressure in high pressure lines thereby permitting connections to be made in high pressure lines with a minimum of force, a coupling with efficient sealing means, and one which is efficient in operation, and very economical in cost.

Various changes may be made in the specific embodiment of my invention without departing from the spirit thereof or from the scope of the appended claims.

What I claim is:

1. A coupling comprising a hollow male coupling member having an open ended connecting portion and having a peripheral groove, a spring urged check valve mounted in said hollow male member and having a sealing means thereon, a female connecting member having an outer cylindrical shell with radially extending cam retaining apertures therein, cam members carried in said cam retaining apertures, a spring urged locking sleeve telescopically disposed on said shell locking said cam members in engagement with said peripheral groove on said male member and telescopically slidable to a retracted position to allow said cam members to move out of said groove, a solid cylindrical inner member concentrically disposed in said shell supported on said shell by an apertured web, said web being attached to said inner cylindrical member and to said shell, and a spring urged longitudinally movable inner sleeve in said female member, said sleeve being in engagement with the inside of said shell and spaced from said inner cylindrical member, said cam members extending inwardly of the inside of said shell, said cylindrical member engaging said spring urged male member check valve holding the sealing member thereon in spaced relation to said hollow male coupling member the end portion of the male member engaging said movable inner sleeve and holding said sleeve in spaced relation to said inner cylindrical member, said locking sleeve slidable over said cam members allowing said cam members to move out of said peripheral groove and said hollow male member to move out of said female member and said spring urged inner sleeve to sealingly engage said cylindrical member and said cam members whereby said cam members are held in engagement with said locking sleeve, holding said locking sleeve in retracted position.

2. The coupling recited in claim 1 wherein a part of said inner sleeve is flush with one end of a female coupling member and a part of said check valve is flush with a part of said male member when said male member is removed from said female member.

3. A coupling comprising a hollow male coupling member having an open ended connecting portion and having a peripheral groove, a spring urged check valve mounted in said hollow male member and having a sealing means thereon, a female connecting member having an outer cylindrical shell with radially extending cam retaining apertures therein, cam members carried in said cam retaining apertures, a spring urged locking sleeve telescopically disposed on said shell locking said cam member in engagement with said peripheral groove on said male member and telescopically slidable to a retracted position to allow said cam members to move out of said groove, a solid cylindrical inner member concentrically disposed in said shell supported on said shell by an apertured web, said web being attached to said inner cylindrical member and to said shell, and a spring urged longitudinally movable inner sleeve in said female member, said sleeve being in engagement with the inside of said shell and spaced from said inner cylindrical member, said cam members extending inwardly of the inside of said shell, said cylindrical member engaging said spring urged male member check valve holding the sealing member thereon in spaced relation to said hollow male coupling member, the end portion of the male member engaging said movable inner sleeve and holding said sleeve in spaced relation to said inner cylindrical member, said locking sleeve slidable over said cam members allowing said cam members to move out of said peripheral groove and said hollow male member to move out of said female member and said spring urged inner sleeve to sealingly engage said cylindrical member and said cam members whereby said cam members are held in engagement with said locking sleeve, holding said locking sleeve in retracted position, said sealing means on said spring urged check valve comprising a washer circular in cross section disposed in an annular groove in the end of said male member check valve.

ALBERT T. SCHEIWER.

References Cited in the file of this patent

UNITED STATES PATENTS

| Number | Name | Date |
|---|---|---|
| 873,366 | Giles | Dec. 10, 1907 |
| 1,317,870 | Fanselow | Oct. 7, 1919 |
| 1,888,459 | Greve | Nov. 22, 1932 |
| 2,208,620 | Baisch | July 23, 1940 |
| 2,319,015 | Speth | May 11, 1943 |
| 2,398,170 | Williams-Foxcroft | Apr. 9, 1946 |
| 2,428,637 | Scheiwer | Oct. 7, 1947 |
| 2,451,441 | Main, Jr. | Oct. 12, 1948 |
| 2,453,389 | Thomas | Nov. 9, 1948 |
| 2,456,045 | Brock | Dec. 14, 1948 |
| 2,461,700 | Scheiwer | Feb. 15, 1949 |
| 2,545,796 | Scheiwer | Mar. 20, 1951 |